United States Patent Office 2,708,163
Patented May 10, 1955

2,708,163

FEED SUPPLEMENT FOR LIVESTOCK AND OTHER ANIMAL FEED

Elton L. St. John, Muncie, Ind.

No Drawing. Application August 12, 1953,
Serial No. 373,920

4 Claims. (Cl. 99—7)

This invention relates to an improvement in livestock feed and in a method for producing the same and it has for its main object to provide a feed supplement which permits to introduce into the feed of farm animals a relatively large quantity of animal fat.

It is well known that animal fat has a high nutritive value which, however, cannot be utilized directly when introduced into a feed because it is difficult to digest and many farm animals like cattle or chickens have a digestive apparatus which is not adapted for the digestion of food of this type. Especially animal fats are not digestible in the form in which they occur even when prepared, as even a small quantity of animal fat, either in its original form or in any prepared form in which relatively large particles of fat occur cause serious disturbances in the digestive organs of the animals. In fact, even a very small amount of fat acts as a cathartic and inevitably causes diarrhea and similar disturbances.

Several attempts have therefore been made to produce a feed consisting essentially of animal fat in which the particles of fat are separated to such an extent that they are prevented from congealing in large lumps. However, these attempts were not successful on account of the above mentioned physiological action on the intestinal tract of the animals.

The invention therefore has the object of preparing the animal fat in such a manner that it retains its nutritive value while it transforms the fat and brings it into such condition that it is easily digested.

According to the invention animal fat of any type is prepared so as to be available in a powdered form with the animal fat so distributed and in such condition that it may readily be absorbed by and digested in the intestinal tract of the animals. To obtain this result the fat is added to water and after this addition the water containing the fat is brought to a boil. To the boiling liquid silicate of soda is added. The sodium silicate may for instance be added in the form of water glass which, as well known, is a mixture of several sodium silicates and is soluble in hot water. The aqueous solution of the sodium silicate or silicates is alkaline having a pH of around 8. It may be noted that the fat is not saponified by the addition of the sodium silicate under the conditions prevailing during this process.

On account of the relatively strong alkalinity of the aqueous solution of sodium silicate or silicates, copperas (ferrous sulfate) is added in order to produce partial neutralization of the boiled mixture, which addition has the advantage of introducing into the feed the mineral iron, thus adding to the content of useful minerals of the feed. However, the quantity of copperas which is added cannot be increased to the point where complete neutralization occurs and therefore sodium bicarbonate is added, the quantity being approximately the same as the quantity of sodium silicate.

The product resulting from this process is a powder in which the animal fat is contained in the form of extremely fine particles only. This powder has a moisture content of around 15–30% and it may be used as a feed supplement such as it is.

The powder will preferably be used in preparing the feed and may be added to corn, oats, alfalfa, bran and other feeding materials. The addition may be made in such a way that the supplement preferably comprises about 28 to 30% of the total weight of the feed.

*Example*

To 10 lbs. of animal fat of any kind, preferably of the kind which would otherwise be used for industrial purposes only, 20 to 30 lbs. of water are added. The quantity of water may be less and it is sufficient to carry out the process with only 10 lbs. of water while 20 to 30 lbs. are preferable. The water containing the fat is now brought to a boil and between 3 to 5 lbs. of silicate of sodium is added using, for instance, water glass which is a mixture of three different silicates. The minimum proportion in this case is about 1 lb. of sodium silicate for every three lbs. of animal fat which have been introduced.

This mixture is now boiled for at least 30 minutes. Preferably the mixture is boiled in a closed vessel and the temperature is maintained in this vessel at 220° to 250° F. The silicate of sodium is strongly alkaline when in solution, its pH being usually in the vicinity of 8. About ¾ lb. of copperas is added after the boiling, but while the mixture is still hot, in order to reduce alkalinity and also for the purpose of introducing the mineral iron into the mixture. Then bicarbonate of sodium is added the quantity of this addition being equal to the quantity of sodium silicate or silicates which had been added before and the mixture is then thoroughly stirred.

The result of this process is the formation of a powder which can be directly used as a feed supplement. The weight of the powder obtained in the example above described starting with about 10 lbs. of animal fat with 20 to 30 lbs. of water is around 40 lbs., the moisture content of the powder being between 28% and 14%, the fat content of an analyzed sample being around 39% with a free fatty acid content on extracted fats of only 0.1%.

The supplement may now be directly added to some basic feed and, as an average, the content of such feed supplement in the feed will be about 25% of the total weight of the feed in which case the fat content of the feed with its addition is around 10%.

Good results were obtained with the following feed mixture serving as an example:

|   | Per cent |
|---|---|
| Ground corn and oats | 60 |
| Alfalfa meal | 10 |
| Feed supplement | 30 |

The basic feed may, of course, be any one of the basic feeds which are recommended by the Agricultural Research Stations.

Feeding experiments thus far conducted, using pigs, calves and chickens show that the supplement is not only well digested by the birds and animals but it also shows that the animals prefer the food to which the mixture has been added to the straight food, and make rapid gains with less food. Also the gain manifests itself much more in the gain of weight of the muscles and bones and much less in the gain of fat on the surface under the skin.

It will also be clear that other substances which are necessary to produce a satisfactory basic feed, such as vitamins, minerals etc., may be incorporated into the powder during the process if so desired.

The invention thus permits the utilization of the highly nutritive animal fats within the feed of animals or birds which would not be capable of digesting such fats in that form in which it can usually be converted.

It will be understood that unessential changes may be made in the process or product without in any way departing from the essence of the invention as defined in the annexed claims.

What is claimed as new is as follows:

1. A process for producing a feed supplement comprising adding sodium silicate to animal fat and water and boiling the mixture, adding copperas to the hot solution for partly neutralizing the alkalinity of the same and further adding sodium bicarbonate for complete neutraliaztion, thus obtaining a powder of a fat content of less than 50% with a negligible free fatty acid content and using the resulting powder as a feed supplement.

2. A process for producing a feed supplement, comprising adding for every 10 lbs. of animal fat between 10 to 30 lbs. of water, then adding approximately 3⅓ lbs. of sodium silicate, boiling the mixture for approximately thirty minutes keeping the temperature at 220°–250° F., then adding 0.75 lb. of copperas and thereafter adding around 3⅓ lbs. of sodium bicarbonate, thus obtaining a powder of a fat content not exceeding 40% with a free fatty acid content of approximately 0.1% and a moisture content of between 14% and 28% and using the resulting powder, directly as a feed supplement.

3. A feed for livestock consisting of ground corn, alfalfa meal and the powder resulting from the process as claimed in claim 1, having a fat content not exceeding 40% with a free fatty acid content of approximately 0.1% and a moisture content of between 14% and 28%.

4. A feed for livestock consisting of 60% ground corn and oats, of 10% alfalfa meal and of 30% of the powder prepared as claimed in claim 2, having a fat content not exceeding 40% with a free fatty acid content of approximately 0.1% and a moisture content of between 14% and 28%.

References Cited in the file of this patent

UNITED STATES PATENTS 1,831,164    Dawe _____ Nov. 10, 1931